United States Patent [19]

Olsen et al.

[11] Patent Number: 5,686,520
[45] Date of Patent: Nov. 11, 1997

[54] SUBSTITUTED 1,4-DIPHENYLBUTADIYNES AND OLIGOMERS THEREOF AS POLYMER FLUIDIZERS AND RESINS

[75] Inventors: Robert Earl Olsen, Placerville; Stephen John Backlund, Fair Oaks; Harlan Frederick Reese, Sacramento, all of Calif.

[73] Assignee: Aerojet-General Corporation, Rancho Cordova, Calif.

[21] Appl. No.: 451,723

[22] Filed: Dec. 5, 1989

Related U.S. Application Data

[62] Division of Ser. No. 207,087, Jun. 15, 1988, abandoned.

[51] Int. Cl.$^6$ ........................................... C08K 5/01
[52] U.S. Cl. ..................... 524/483; 106/901; 252/363.5; 526/285
[58] Field of Search .................. 252/363.5; 526/285; 106/901; 423/447.1, 447.2, 447.4, 447.5; 524/483

[56] References Cited

U.S. PATENT DOCUMENTS

| | | | |
|---|---|---|---|
| 3,066,119 | 11/1962 | Meriwether et al. | 585/416 X |
| 3,756,982 | 9/1973 | Korshak et al. | 526/285 X |
| 3,926,897 | 12/1975 | Cessna, Jr. | 526/285 X |
| 3,926,907 | 12/1975 | Engle, III | 526/285 X |
| 4,108,942 | 8/1978 | Chalk et al. | 526/159 X |
| 4,384,158 | 5/1983 | Ishihara et al. | 585/534 |

FOREIGN PATENT DOCUMENTS

| 0086106 | 5/1985 | Japan | 526/285 |

OTHER PUBLICATIONS

Bracke: "Polymers Containing Benzene Chains", *Chem. Abstracts*, vol. 79, 1973, p. 20, 5878h.

*Primary Examiner*—Richard D. Lovering
*Attorney, Agent, or Firm*—Townsend and Townsend and Crew LLP

[57] ABSTRACT

Compounds having the formula

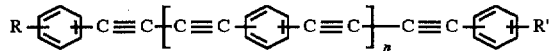

in which R is a member selected from the group consisting of H, $CH_2=CH-$, and $CH\equiv C-$, R' is a member selected from the group consisting of $-CH=CH_2$ and $-C\equiv CH$, and n is zero, 1, 2, 3 or 4, are useful as fluidizers for polyphenylene prepolymers, rendering the latter sufficiently fluid for processing to form high-performance carbonaceous materials. These compounds are also useful themselves as monomers and prepolymers for the formation of the high-performance carbonaceous materials.

14 Claims, 2 Drawing Sheets

SUBSTITUTED 1,4-DIPHENYLBUTADIYNES AND OLIGOMERS THEREOF AS POLYMER FLUIDIZERS AND RESINS

This is a Division of application Ser. No. 07/207,087 filed Jun. 15, 1988, now abandoned.

This invention relates to polyphenylene resins and methods for forming high-density carbon materials from such resins.

BACKGROUND OF THE INVENTION

High-density carbon-carbon composites are extremely strong materials capable of withstanding high temperatures. Such composites find use in the manufacture of structural parts for high-performance use. Examples of structural parts made from these materials are heat shields for reentry vehicles and solid propellant rocket motor nozzles.

These composites are formed by pyrolysis of resins, phenolic resins being in general use at present. Certain qualities of the resins are significant in terms of their processing and performance as well as the characteristics of the final product. These resin qualities include solubility, flow characteristics, and char yield (with char yield defined as the percent weight retention at 1000° C.) upon pyrolysis of the resin, as well as mechanical properties of the final product. A high char yield, or low volatiles evolution, is particularly important since it relates to the minimization of weight loss shrinkage, pores and cracking upon carbonization and graphitization.

The phenolic resins in current use generally have char yields of less than 50%, due to the release of such decomposition products as water carbon monoxide, phenol and methane upon pyrolysis and carbonization. With such a high quantity of volatiles produced, the resulting composite is porous, low in density and susceptible to stress due to matrix shrinkage. To compensate for these deficiencies, the composite after first having been formed is impregnated with coal tar pitch and repyrolysed (i.e., "densified"). Five to seven densification cycles are generally required to achieve a product with thermostructural properties adequate for high performance use.

Another undesirable feature of the high temperature resins, including polyimides, phenolics and other highly aromatic systems, is their high viscosity, causing them to have poor flow properties. This feature makes it difficult to mold these resins into desirable shapes by conventional techniques. It also makes it difficult for these resins to penetrate woven fiber networks. As a result, the use of these resins is often limited to the formation of laminates or composites which do not involve fiber network penetration.

While viscosities will decrease at elevated temperatures, cross linking and further polymerization also begins to occur. While flowability may be enhanced at lower temperatures by adding a solvent to the resins, char yield and product integrity will suffer as the solvent either evaporates or decomposes.

SUMMARY OF THE INVENTION

It has now been discovered that compounds of the following structure are effective both as fluidizers (i.e., viscosity reducers) for polyphenylene polymers and as starting materials for the formation of high char yield polyphenylenes:

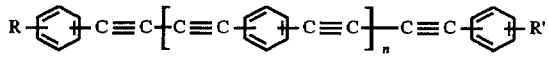

in which:

R is a member selected from the group consisting of H, $CH_2$=CH—, and CH≡C—;

R' is a member selected from the group consisting of —CH=$CH_2$ and —C≡CH; and n is zero, 1, 2, 3 or 4.

Within the scope of the above formula, certain embodiments are preferred. These include compounds in which R is H and n is zero, 1 or 2, preferably zero; those in which R' is —CH=$CH_2$ and n is zero, 1 or 2; and those in which R is H, R' is —CH=$CH_2$ and n is zero, 1 or 2. Noting that with the exception of those embodiments where R is H, each phenyl ring in the formula has two substituents, the positions of these substituents may be ortho, meta or para with respect to each other, either the same or mixed within the formula. The invention also extends to combinations of the various isomers, differing in the relative positions of the ring substituents. Meta and para positions are preferred, particularly on the terminal phenyl rings, and isomer mixtures containing both meta end para substituted isomers are further preferred.

These compounds offer a number of advantages over conventional organic solvents. For example, when mixed with polyphenylene propolymers, they do not evolve volatile components when the mixture is cured. Furthermore, they permit the cure reaction to proceed in a convenient processing temperature range. Still further, they themselves react with polyphenylene prepolymer by copolymerizing with them. Finally, the compounds are useful themselves in forming polyphenylene prepolymers which are in turn cured and pyrolysed to yield high-performance carbonaceous materials with a high char yield.

Other features and advantages of the invention will be apparent from the following description.

DETAILED DESCRIPTION OF THE INVENTION AND PREFERRED EMBODIMENTS

Figure 1:
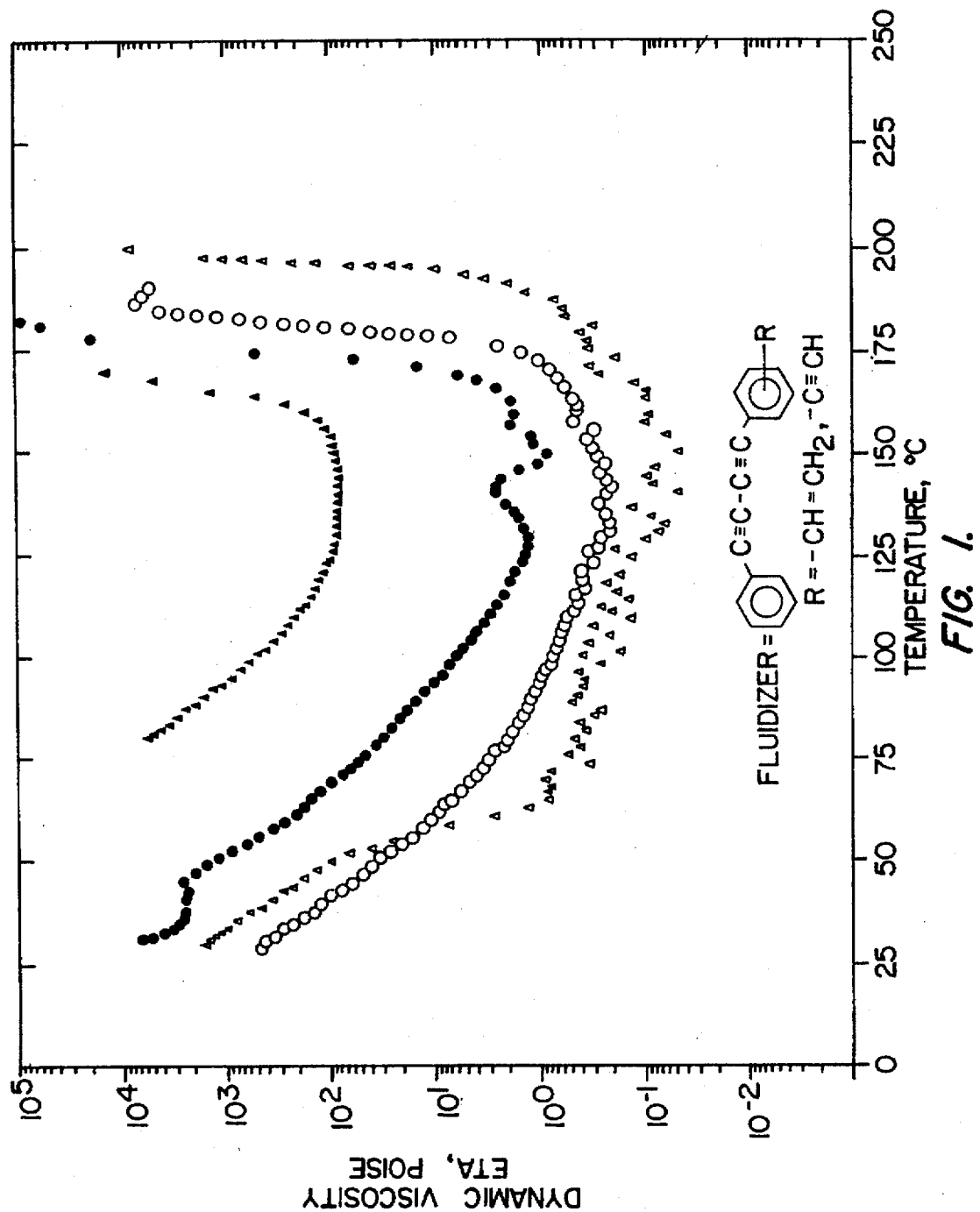
FIG. 1 is a plot of dynamic viscosity versus temperature, illustrating one example of a combination of a fluidizer in accordance with the present invention and a polyphenylene polymer.

Compounds within the above formula may be prepared by conventional techniques. Selection of the starting material, catalysts and reaction conditions may be tailored to achieve compounds of a particular formula within the generic formula shown. Typical starting materials will include vinylbenzene, ethynylbenzene, divinylbenzene, diethynylbenzene, vinylethynylbenzene, and various halo-substituted derivatives thereof, particularly phenylethynyl bromides.

For example, compounds in which R is H and n is zero may be prepared by reacting either diethynylbenzene or vinylethynylbenzene with phenylethynyl bromide in the presence of cuprous chloride and hydroxylamine hydrochloride. Compounds in which R is H and R' is vinyl or ethynyl, with n being zero, 1 or 2, can be prepared by reacting diethynylbenzene or vinylethynylbenzene with phenylacetylene in the presence of cuprous chloride, oxygen and tetramethylethylenediamine. Compounds in which R and R' are both vinyl, and n is zero, 1 or 2 can be prepared by treating either diethynylbenzene or vinylethynylbenzene with cuprous chloride, oxygen and tetramethylethylenediamine.

Vinylethynylbenzene and diethynylbenzene may be prepared as a mixture from technical grade divinylbenzene. The latter is actually a mixture of divinyl and vinylethylbenzenes with minor amounts of diethylbenzenes and naphthalene. The divinylbenzenes are present in greater amounts than the vinylethylbenzenes, and the meta-isomers predominate.

To prepare vinylethynylbenzene and diethynylbenzene from technical grade divinylbenzene, the latter may be brominated followed by dehydrobromination, according to conventional procedures. Addition of bromine to the carbon-carbon double bonds occurs rapidly at room temperature in carbon tetrachloride solution. Bromination at the ethyl group may be accomplished by the use of a free-radical initiator or by reflexing in carbon tetrachloride. The reaction with the free-radical initiator occurs more rapidly. Dehydrobromination is then achieved by the use of a non-nucleophilic base such as potassium t-butoxide or a phase transfer catalyst with powdered potassium hydroxide. The product may then be extracted with hexane, and purified by distillation or chromatography.

Polyphenylene polymers to which the compounds herein are applicable as fluidizers may vary widely in structure and molecular weight. The polymers will generally comprise phenyl rings linked either directly by single bonds or by short-length alkyl chains, generally with unsaturated portions. The polymers will extend to both straight-chain and branched-chain configurations. The resins contemplated for use are prepolymers, not fully cross linked, preferably only partially cured, generally with molecular weights less than about 100,000. Examples of such resins may be found in U.S. patent application Ser. No. 07/207,324, filed Jun. 15, 1988 and now U.S. Pat. No. 5,594,058, entitled "Polyphenylene Resins From Vinylethynylbenzene, Diethynylbenzene and Phenylacetylene," and U.S. patent application Ser. No. 07/207,321, filed Jun. 15, 1988 and now U.S. Pat. No. 5,576,375, entitled "Poly(phenylene-vinylene) Resins From Vinylethynylbenzene and Diethynylbenzene," both filed on even date with the parent application hereof, naming the same inventors and assignee as named herein.

The first of the above-referenced patent applications discloses polyphenylene polymers formed by copolymerization of the following monomers:

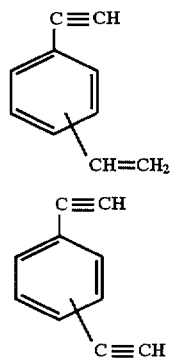

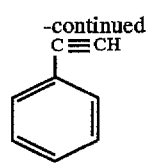

in which a substantial portion of the vinyl groups of monomer (i) are retained unreacted. In preferred embodiments of this copolymer, at least about 75% of the vinyl groups remain unreacted, the average molecular weight ranges from about 5,000 to about 50,000, and the relative amounts of the monomers are such that monomer (ii) comprises from about 50% to about 75% the weight of monomers (i) and (ii) combined and the mole ratio of monomers (i) plus (iii) to monomer (ii) is from about 1 to 2.

The polymer disclosed in the second of these applications is one formed by copolymerization of the monomers:

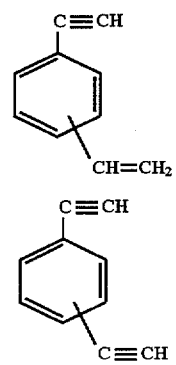

with substantial portions of the ethynyl and vinyl groups retained from the monomers. Preferred embodiments of the latter are those in which the polymer contains at least about 75% of the vinyl groups, at least about 4 mg of the ethynyl groups per gram of polymer, and has an average molecular weight ranging from about 2,000 to about 50,000, and the relative amounts of the monomers are such that monomer (ii) comprises from about 50% to about 70% by weight of monomers (i) and (ii) combined.

The quantity of fluidizing compounds in accordance with the present invention in combination with any particular polyphenylene resin is not critical and may vary widely, depending on the particular polyphenylene polymer being used, the properties sought to be achieved, and the anticipated processing conditions. Appropriate amounts in any case will be amounts which substantially lower the viscosity of the polyphenylene and convert it to a form sufficiently fluid for processing as desired, i.e., for penetration of fiber matrices or molding into intricate shapes. In most cases, resin compositions containing at least about 5% of the fluidizing compound will provide the best results, with at least about 20% preferred, and about 30% to about 60% particularly preferred.

The fluidizer may be mixed directly with the polyphenylene polymer to form the fluid resin, or the two may be combined with an organic solvent, such as benzene, toluene, methylene chloride, carbon tetrachloride, or any other solvent in which the materials are soluble, to facilitate the mixing and reach a homogeneous state more quickly. The solvent may then be evaporated to leave the fluid and moderately viscous resin consisting solely of the polyphenylene polymer and fluidizer.

Other additives may be included in the resin for a variety of purposes, as would be known to those skilled in the art.

As mentioned above, the compounds herein may also serve as resin precursors themselves, without being combined with any other phenylene compounds or prepolymers.

The compounds of the present invention will polymerize and cross link in a manner analogous to the polyphenylene prepolymers. Pyrolysis of these compounds in their polymerized state will produce high char yield compositions with favorable and advantageous properties as described above.

The compounds of the present invention, whether alone or in combination with other polyphenylene prepolymers, may be processed into high-performance structural materials in accordance with conventional techniques. A carbon filler, such as finely divided graphite, is generally used to increase the resin density, toughness and char yield further. Surface-active agents, particularly nonionic surfactants, may be used to enhance the wetting of the graphite and to help avoid agglomeration. Typical procedures for cure and pyrolysis would be curing at a temperature of about 100°–200° C., carbonization at a temperature of about 800°–1,000° C., then forming the carbonized resin into the desired structure, followed by graphitization at 1,800°–2,500° C.

The following examples are offered for purposes of illustration, and are not intended to limit the invention in any manner.

EXAMPLE 1

A. Preparation of Vinylethynylbenzene and Diethynylbenzene

To a 1-liter, round bottomed flask fitted with an addition funnel, thermometer, stirrer, an ice-water cooling bath and a $N_2$ purge connected to a caustic trap, was charged 500 mL of carbon tetrachloride and 100 g of technical-grade divinylbenzene (analysis shown in Table 1). The solution was cooled to 10° C., and bromine (256 g, 1.6 mol) was added dropwise, maintaining the reaction temperature at less than 20° C. by controlling the rate of addition. Benzoyl peroxide (5.0 g, 20.6 mmol) was added, and the mixture slowly heated to reflux (79° C.). (Caution: HBr evolved). The process was monitored by capillary column gas chromatography, and when conversion to α-bromoethyl-1,2-dibromoethylbenzene reached 99%, heating was discontinued. After cooling to ambient, the reaction mixture was washed with 100 mL of 25% caustic solution and then twice with 250 mL aliquots of water. The solution was dried (MgSO$_4$) and stripped to yield 317 g (102%) of yellow solid.

To a 3-liter, round bottomed flask fitted with high speed agitation, a reflux condensor, thermometer and static $N_2$ head was charged 600 mL of petroleum ether, 135 g of brominated divinylbenzene, 6.6 g (0.012 mol) of tetraoctyl ammonium bromide and 316 g (5.6 mol) of powdered potassium hydroxide. The rapidly stirred mixture was heated to reflux (75°–80° C.) until the reaction was complete (~3 hours) as shown by capillary column gas chromatography. The mixture was filtered, the filter cake washed with 100 mL of petroleum ether, and the combined filtrates stripped to yield 31.2 g (88% yield) of pale yellow liquid.

TABLE 1

| Capillary Column Gas Chromatograph Area Percent Analysis of Technical-Grade Divinylbenzene and Monomer Mixture | | | |
|---|---|---|---|
| Starting Material | Area % | Monomer Mixture | Area % |
| m-divinyl | 41.2 | m-diethynyl | 46 |
| p-divinyl | 15.4 | p-diethynyl | 15 |
| m-vinylethyl | 30.9 | m-vinylethynyl | 29 |
| p-vinylethyl | 8.5 | p-vinylethynyl | 9 |
| m-diethyl | 0.9 | m, p-divinyl | <1 |
| p-diethyl | 0.9 | | |
| naphthalene | 1.6 | naphthalene | <1 |

B. Preparation of Ethynyl/vinyl-1,4-diphenylbutadiyne (E/V DB)

A 12-liter, 3-necked Morton flask was equipped with agitation, an ice-water cooling bath, a thermometer, and an addition funnel. The flask was flushed with nitrogen and equipped with a positive nitrogen atmosphere head bubbler. To the flask was added 2.5 L of methanol, 0.58 g (5 mmol) of cuprous chloride, 10.2 g (0.14 mol) of hydroxylamine hydrochloride, and 390 g (5.4 mol) of n-butylamine. The mixture was stirred until solution was complete, and 501 g (3.9 mol) of the mixture prepared in part A above dissolved in 0.5 L of methanol was added with vigorous stirring. An orange-colored emulsion resulted. A solution of 703 g (3.9 mol) of 1-bromo-2-phenylacetylene in 0.5 L of methanol was added over a one-hour period to form a yellow emulsion. The addition raised the reaction temperature from 22° C. to 30° C. and ice was added to the cooling bath to maintain the reaction at about 30° C. The exotherm slowly subsided and stirring was continued overnight. The next day, an additional 0.58 g of cuprous chloride and 10.2 g of hydroxylamine hydrochloride was added. The reaction exothermed from 22° C. to 32° C. and stirring was continued for an additional 5 hours.

The reaction was monitored by capillary column gas chromatography. The analysis indicated the reaction mixture contained at this point 1.6 area percent 1-bromo-2-phenylacetylene. A third charge of catalyst was then added and stirring continued for 2 hours. The GC analysis now indicated the reaction was complete and it was quenched into a mixture of 4 L of water and 3 L of methylene chloride. Phases were separated and the aqueous phase extracted twice more with 3-liter aliquots of methylene chloride. The organic phases were combined, dried over anhydrous magnesium sulfate, and methylene chloride removed under reduced pressure to leave 721 g (80.5 percent yield) of a mixture of isomers of E/VDB.

Properties of the product were determined to be as follows:

a. Softening Point. The product was a low melting wax, liquifying at temperatures above 35° C.

b. Solubility. The product was soluble in methylene chloride, methyl isobutylketone, tetrahydrofuran, and toluene. It was insoluble in acetone, hexane, and alcohols.

c. Dynamic Viscosity. The dynamic viscosity of the product dropped from about 1000 poise at ambient temperature to 0.2 poise or less at 75° to 175° C., then rapidly increased in viscosity as the temperature rose further and the material began to undergo thermal cure. This indicates that the product has both the desired elevated temperature low viscosity flow properties to be useful as a fluidizer in composite formulations and a wide temperature range of low viscosity, thereby providing a wide thermal processing window.

d. Char Yield. A sample of the product was cured overnight (200° C., 200 psi) and post-cured for 16 hours (300° C., argon atmosphere) and analyzed by thermal gravimetric analysis. The weight retention to 1000° C. was 84 percent (heating rate 10°/min, nitrogen atmosphere).

e. Nuclear Magnetic Resonance Spectrum. Nuclear Magnetic Resonance was used to establish the presence of vinyl (—CH=CH$_2$) and ethynyl (—C≡CH) protons in the product. The spectrum gave the expected absorption pattern for vinyl and ethynyl protons which result from a mixed meta- and para-aromatic substitution.

f. Infrared Spectrum. A Fourier Transform Infrared Spectrum of the product confirmed the presence of a diethynylene group (—C≡C—C≡C—) by absorption at 2219 and 2146 cm$^{-1}$ (literature value reported as 2215 and 2155 cm$^{-1}$). In addition, the characteristic sharp carbon-hydrogen stretching vibration from a primary acetylene (—C≡CH) was readily apparent at 3300 cm$^{-1}$.

EXAMPLE 2

Preparation of Vinyl 1,4-Diphenylbutadiyne (VDB) Including Oligomers

Part A of Example 1 was repeated, and the resulting intermediate was further reacted as follows:

To a 50-mL flask fitted with agitation and a gas inlet tube was added 1.89 g (15 mmol) of the intermediate, 0.51 g (5 mmol) of phenylacetylene, 0.23 g (2 mmol) of tetramethylethylenediamine, 0.20 g (2 mmol) of cuprous chloride and 25 mL of acetone. Oxygen was slowly bubbled through the solution, causing a slow exotherm from 22° C. to 35° C. and the precipitation of a pale yellow solid. A water bath was used to cool the reaction and oxygen was passed through the mixture for one hour. The reaction mixture was quenched into 50 mL of 1N hydrochloric acid and extracted with three 50-mL aliquots of methylene chloride. The combined organic phase was extracted in turn with 50-mL portions of 1N hydrochloric acid, saturated sodium bicarbonate solution and water. After drying over anhydrous magnesium sulfate, solvent was removed under reduced pressure to leave 2.12 g (88% yield) of a mixture of isomers of vinyl 1,4-diphenylbutadiyne (VDB) and oligomers as a pasty, low melting yellow solid.

EXAMPLE 3

Scale-up Preparation of Vinyl-1,4-diphenylbutadiyne (VDB) Including Oligomers

Part A of Example 1 was repeated, and the resulting intermediate was further reacted as follows:

To a 12-liter flask fitted with agitation, a thermometer, an ice-water cooling bath and a gas inlet tube, were added 324 g (2.57 mol) of the intermediate, 131 g (1.28 mol) of phenylacetylene, 44.3 g (0.38 mol) of tetramethylethylenediamine, 38.6 g (0.38 mol) of cuprous chloride, and 9 liters of methylene chloride. Air was slowly bubbled through the stirred solution, causing a slow exotherm from 20° to 24° C. and the precipitation of a pale yellow solid. The reaction was monitored by capillary column gas chromatography by periodic withdrawal of small samples. After 3 hours and 30 minutes the reaction was complete and the mixture filtered. The methylene chloride solution was washed in succession with two 1-liter aliquots of 1N hydrochloric acid, followed by 1-liter of saturated sodium bicarbonate solution, and finally 1-liter of water. After drying over anhydrous magnesium sulfate, solvent was removed under reduced pressure to leave 310 g (85% yield) of a mixture of isomers of vinyl-1,4-diphenylbutadiyne (VDB).

Properties of the product were determined to be as follows:

a. Softening Point. The product was a low melting wax-like material, liquifying at temperatures above 30° C.

b. Solubility. The product was soluble in methylene chloride, methylisobutyl ketone, tetrahydrofuran, acetone, and toluene. It was insoluble in water and slightly soluble in hexanes and alcohols.

c. Dynamic Viscosity. The dynamic viscosity of the product decreased from about 1000 poise at ambient temperature to 0.2 poise from 120° to 190° C., then rapidly increased in viscosity as the temperature rose further and the material began to cure. This data demonstrates that the product has both the desired elevated temperature low viscosity flow properties to be useful as a fluidizer in composite formulations and the desirable wide temperature range of low viscosity, thereby providing a wide thermal processing window.

d. Char Yield. A sample of the product was cured overnight at 165° C. and 200 psi and then analyzed by thermal gravimetric analysis. The weight retention to 1000° C. was 84 percent (heating rate 10°/min, nitrogen atmosphere).

e. Nuclear Magnetic Resonance Spectrum. Nuclear Magnetic Resonance was used to establish the presence of vinyl (—CH=CH$_2$) and ethynyl (—C≡CH) protons in the product.

f. Infrared Spectrum. A Fourier Transform Infrared Spectrum of the product confirmed the presence of terminal acetylene (—C≡CH) groups (absorption at 3295 cm$^{-1}$) and the diethynylene group (absorptions at 2218 and 2147 cm$^{-1}$).

EXAMPLE 4

Preparation of Divinyl 1,4-Diphenylbutadiyne (DDB) Including Oligomers

Part A of Example 1 was repeated, and the resulting intermediate was further reacted as follows:

To a 1-liter flask fitted with agitation, a thermometer and a gas inlet tube was added 47.8 g (379 mmol) of the intermediate, 5.75 g (50 mmol) of tetramethylethylenediamine, 5.00 g (50 mmol) of cuprous chloride and 500 mL of acetone. Oxygen was slowly bubbled through the solution for one hour, precipitating a pale yellow solid. The reaction was poured into a mixture of 500 mL of 1N hydrochloric acid and 1 L of methylene chloride. After filtering, the phases were separated and the filter cake washed with an additional 100 mL of methylene chloride. The combined organic phase was washed in turn with 250 mL aliquots of 1N hydrochloric acid, saturated sodium bicarbonate solution, and water. After drying over anhydrous magnesium sulfate, solvent was removed under reduced pressure to leave 16.9 g (35% yield) of a mixture of isomers of divinyl 1,4-diphenylbutadiyne and oligomers as a low melting, pasty yellow solid.

EXAMPLE 5

Use as Fluidizers

The product of Example 1 (E/VDB) was combined separately with two polyphenylene polymers. The first was poly(diethynylbenzene-vinylethynylbenzene) (PDVB), as prepared in Example 1 of copending U.S. patent application Ser. No. 07/207,324, filed Jun. 15, 1988 and now U.S. Pat. No. 5,594,058, and the second was vinylpolyphenylene (VPP), as prepared in Example 1 of copending U.S. patent application Ser. No. 07/207,321, filed Jun. 15, 1988 and now U.S. Pat. No. 5,576,375, both referenced above.

Figure 2:
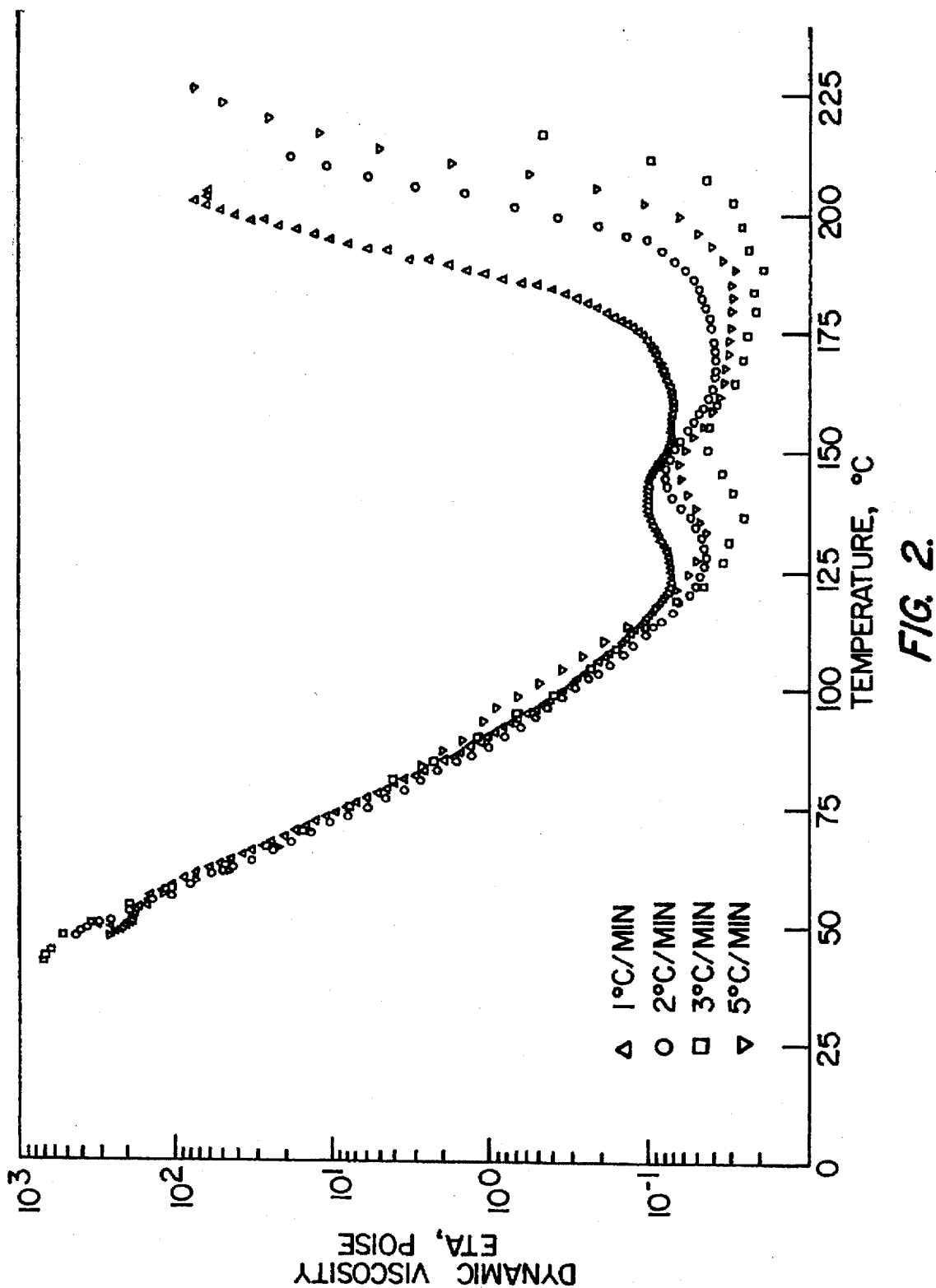
FIG. 2 is a similar plot illustrating a second example using a different polyphenylene polymer.

The combinations were prepared by combining the E/VDB with either the PDVB or the VPP at varying ratios, and adding methylene chloride in each case as a mixing aid. The methylene chloride was then removed by evaporation under reduced pressure. The properties of each mixture were then evaluated, with the following results:

a. Dynamic viscosity. Viscosities for four E/VDB-PDVB mixtures at E/VDB contents of 89%, 66%, 50% and 33% by weight, respectively, were determined over temperatures ranging from 25° C. to 200° C. at a heating rate of 2° C. per minute. The results are shown in FIG. 1. Viscosities for E/VDB-VPP mixtures containing 40% E/VDB were determined at variable heating rates, i.e., 1° C./min, 2° C./min, 3° C./min and 4° C./min, with results shown in FIG. 2. The data in these figures indicate that resins can be tailored to have viscosities at any level within a wide range. The data also show that the viscosities decrease by about four orders of magnitude upon heating from ambient temperature to the temperature at which gelation is initiated, with minimum viscosities of about 0.1 to about 1 poise.

b. Char yields. Char yields on 40/60 weight ratio combinations of E/VDB-VPP and E/VDB-PDVB were determined by thermal gravimetric analysis. When heated to 1000° C., the E/VDB-VPP combination showed 74.9% weight retention, and the E/VDB-PDVB combination showed 80.0% weight retention. Weight loss occurred in two distinct temperature regions in each case, 500°–550° C. and 700°–750° C.

c. Comparison with state-of-the-art resin. The two resins, at the weight ratios indicated in the preceding paragraph, were compared with a phenolic resin designated USP-39A in terms of char yield and shrinkage behavior. The phenolic resin is representative of the current state-of-the-art in resins used for high performance carbon-carbon composites. The results indicated a 50% greater char yield for each of the two resins of the present invention. The linear shrinkage was 3.1% for E/VDB-VPP and 4.9% for E/VDB-PDVB, as compared with 18.2% for the phenolic resin.

The foregoing is offered primarily for purposes of illustration. It will be readily apparent to those skilled in the art that numerous variations, modifications and substitutions may be made in the materials, procedures and operating conditions described herein without departing from the spirit and scope of the invention.

What is claimed is:

1. A polyphenylene polymer resin comprising:

(a) a polyphenylene polymer formed by copolymerization of the following monomers

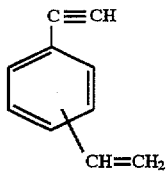
(i)

-continued

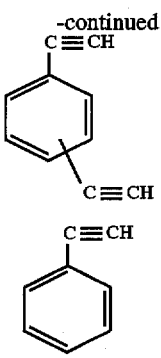
(ii)

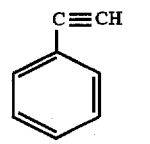
(iii)

said polymer containing at least a substantial portion of the vinyl groups of monomer (i) unreacted; and (b) a fluidizing compound having the formula

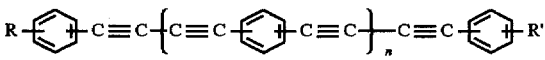

in which:

R is a member selected from the group consisting of H, CH$_2$=CH—, and CH≡C—;

R' is a member selected from the group consisting of —CH=CH$_2$ and —C≡CH; and n is zero, 1, 2, 3 or 4;

in an amount sufficient to substantially lower the viscosity of said polyphenylene polymer.

2. A polyphenylene polymer resin in accordance with claim 1 in which said polyphenylene polymer contains at least about 75% of said vinyl groups unreacted, has an average molecular weight of from about 5000 to about 50,000, and is formed by copolymerization of said monomers in relative amounts such that monomer (ii) comprises from about 50% to about 70% by weight of monomers (i) and (ii) combined and the mole ratio of monomers (i) plus (iii) to monomer (ii) is from about 1 to about 2.

3. A polyphenylene polymer resin comprising:

(a) a polyphenylene polymer formed by copolymerization of the following monomers

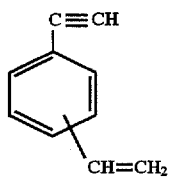
(i)

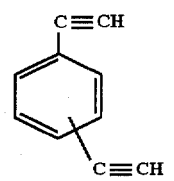
(ii)

said polymer containing at least a substantial portion of the —C≡H groups and —CH=CH$_2$ groups from said monomers; and (b) a fluidizing compound having the formula

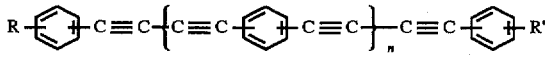

in which:

R is a member selected from the group consisting of H, CH$_2$=CH—, and CH≡C—;

R' is a member selected from the group consisting of —CH=CH$_2$ and —C≡CH; and n is zero, 1, 2, 3 or 4;

in an amount sufficient to substantially lower the viscosity of said polyphenylene polymer.

4. A poly(phenylene-vinylene) polymer resin in accordance with claim 3 in which said poly(phenylene-vinylene) polymer contains at least about 75% of said —CH=CH$_2$ groups unreacted, contains at least about 4 milligrams of —C≡CH groups retained per gram of said poly(phenylene-vinylene) polymer, has an average molecular weight of from about 2000 to about 50,000, and is formed by copolymerization of said monomers in relative amounts such that monomer (ii) comprises from about 50% to about 70% by weight of monomers (i) and (ii) combined.

5. A polyphenylene polymer resin comprising:

(a) a polyphenylene polymer; and (b) a fluidizing compound having the formula

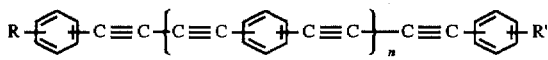

in which:

R is a member selected from the group consisting of H, CH$_2$=CH—, and CH≡C—;

R' is —CH=CH$_2$; and n is zero, 1 or 2;

in an amount sufficient to substantially lower the viscosity of said polyphenylene polymer.

6. A polyphenylene polymer resin in accordance with claims 1, 3 or 5 in which said fluidizing compound comprises at least about 5% of said resin by weight.

7. A polyphenylene polymer resin in accordance with claims 1, 3 or 5 in which said fluidizing compound comprises at least about 20% of said resin by weight.

8. A polyphenylene polymer resin in accordance with claims 1, 3 or 5 in which said fluidizing compound comprises from about 30% to about 60% of said resin by weight.

9. A polyphenylene polymer resin in accordance with claims 1 or 3 in which R is H and n is zero, 1 or 2.

10. A polyphenylene polymer resin in accordance with claims 1, 3 or 5 in which R is H and n is zero.

11. A polyphenylene polymer resin in accordance with claims 1, 3 or 5 in which R occupies either the meta- or para-position on the leftmost phenyl ring in said formula of component (b) with respect to the ethynyl substituent attached thereto, and R' occupies either the meta- or para-position on the rightmost phenyl ring in said formula of component (b) with respect to the ethynyl substituent attached thereto.

12. A polyphenylene polymer resin in accordance with claims 1, 3 or 5 in which the substituents of each ring of said formula of component (b) are positioned either meta- or para- with respect to each other.

13. A polyphenylene polymer resin in accordance with claims 1, 3 or 5 in which component (b) is a mixture of said compounds differing in the relative positions of attachment of the moieties bonded to at least one of the phenyl rings therein.

14. A polyphenylene polymer resin comprising:

(a) a polyphenylene polymer formed by copolymerization of the following monomers

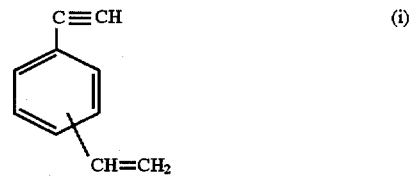

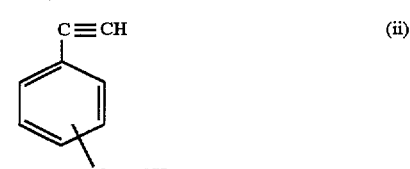

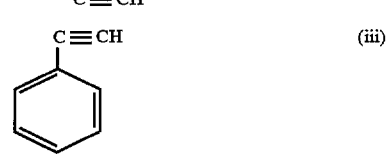

said polymer containing at least a substantial portion of the vinyl groups of monomer (i) unreacted; and (b) a fluidizing compound having the formula

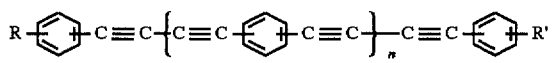

in which:

R is H;

R' is —CH=CH$_2$; and n is zero, 1 or 2;

in an amount sufficient to substantially lower the viscosity of said polyphenylene polymer.

* * * * *